US009960340B2

(12) United States Patent
Fathi et al.

(10) Patent No.: US 9,960,340 B2
(45) Date of Patent: May 1, 2018

(54) AMPLIFIED PIEZO ACTUATOR WITH COARSE ADJUSTMENT

(71) Applicant: Thorlabs, Inc., Newton, NJ (US)

(72) Inventors: Saeed Fathi, Cambridge (GB); Mark Robson, Cambridge (GB); Keith Dhese, Cambridge (GB)

(73) Assignee: Thorlabs, Inc., Newton, NJ (US)

( * ) Notice: Subject to any disclaimer, the term of this patent is extended or adjusted under 35 U.S.C. 154(b) by 408 days.

(21) Appl. No.: 14/825,732

(22) Filed: Aug. 13, 2015

(65) Prior Publication Data
US 2016/0049575 A1   Feb. 18, 2016

Related U.S. Application Data

(60) Provisional application No. 62/037,997, filed on Aug. 15, 2014.

(51) Int. Cl.
| | |
|---|---|
| *H01L 41/09* | (2006.01) |
| *H01L 41/083* | (2006.01) |
| *H02N 2/04* | (2006.01) |
| *H02N 2/10* | (2006.01) |

(52) U.S. Cl.
CPC .......... *H01L 41/083* (2013.01); *H02N 2/043* (2013.01); *H02N 2/101* (2013.01)

(58) Field of Classification Search
USPC ................................................ 310/311–371
See application file for complete search history.

(56) References Cited

U.S. PATENT DOCUMENTS

| | | | |
|---|---|---|---|
| 4,976,553 A | 12/1990 | Yamaguchi et al. | |
| 5,543,670 A * | 8/1996 | Luecke | H01L 41/12 310/26 |
| 6,265,810 B1 * | 7/2001 | Ngo | H01L 41/053 310/328 |
| 6,273,681 B1 * | 8/2001 | Yamakawa | B64C 27/001 310/328 |
| 6,465,936 B1 | 10/2002 | Knowles et al. | |
| 8,154,173 B2 | 4/2012 | Parker et al. | |

(Continued)

FOREIGN PATENT DOCUMENTS

WO   2011041689 A2   4/2011

OTHER PUBLICATIONS

International Search Report with Written Opinion, dated Dec. 10, 2015, for corresponding international application PCT/US2015/045067.

(Continued)

*Primary Examiner* — Thomas Dougherty
(74) *Attorney, Agent, or Firm* — Graham Curtin, P.A.

(57) ABSTRACT

A piezoelectric actuator with integrated features to provide coarse position adjustment of a pushing threaded rod and also mechanically amplified piezo motion for fine position adjustment is presented here in three design variants. The mechanical amplifier houses one or more piezo stacks in longitudinal axis with preload to translate an amplified motion in the order of a few times in the transverse axis, perpendicular to the piezo stack motion. The piezo amplifier output travel is transmitted to the threaded rod with a ball at the end to push a desired surface for position adjustments and motion translation in application such as a mirror mount.

15 Claims, 12 Drawing Sheets

(56) References Cited

U.S. PATENT DOCUMENTS

| | | | |
|---|---|---|---|
| 2006/0175934 A1* | 8/2006 | Or | H01L 41/0946 |
| | | | 310/328 |
| 2010/0096950 A1* | 4/2010 | Nagamitsu | G02B 7/102 |
| | | | 310/333 |
| 2010/0206103 A1 | 8/2010 | Duits et al. | |
| 2010/0308689 A1* | 12/2010 | Rahman | E21B 23/00 |
| | | | 310/328 |
| 2013/0038172 A1 | 2/2013 | Nagase et al. | |
| 2014/0184024 A1* | 7/2014 | Loverich | H02N 2/188 |
| | | | 310/328 |

OTHER PUBLICATIONS

Claeyssen, Frank et al. Amplified Piezoelectric Actuators: Static & Dynamic Applications. Ferroelectrics, 351:3-14, 2007.
Hata, Yoshiyuki et al. Development of fish robot using stacked-type electrostatic actuators. XVII International conference on Electrical Machines, 2006.
Extended European Search Report, dated Mar. 12, 2018, including the European search opinion, issued by the European Patent Office for corresponding European Patent Application No. 15831938.4.

* cited by examiner

AMPLIFIED PIEZO ACTUATOR WITH COARSE ADJUSTMENT

CROSS-REFERENCE TO RELATED APPLICATIONS

This application claims the benefit of U.S. Provisional Patent Application No. 62/037,997, filed Aug. 15, 2014, the contents of which are incorporated by reference herein. This application also relates to U.S. Provisional Application No. 62/050,814, filed Sep. 16, 2014, the contents of which are hereby incorporated by reference.

FIELD OF THE INVENTION

The invention generally relates to piezo actuators. More particularly, the invention relates to amplified piezo actuators with coarse adjustment.

BACKGROUND

Piezoelectric stacks provide a limited displacement upon excitation via a change of applied voltage. Flexure based mechanical structures have been developed to amplify the motion usually in a transverse direction to the piezo expansion in the order of a few time typically providing displacement in the order of up to 100s of microns. However, applications such as steering beams in mirror mounts, the possibility of coarse adjustment in the order of few millimeters as well as fine piezo driven adjustment in the order of sub-micron to a few hundreds of micros is not presented within one device. Therefore, there is a need to provide both coarse and fine adjustment within an integrated device for such requirements.

SUMMARY

One embodiment of the invention provides an actuator, including: a threaded screw; and a piezo amplifier; wherein the piezo amplifier includes: a top wall, a bottom wall, a first and second side walls, the walls being joined by flex hinges; a first and second piezo stacks; and an intermediate coupling component; wherein one end of the first piezo stack is coupled to the first side wall, one end of the second piezo stack is coupled to the second side wall, and the other ends of the first and second piezo stacks couple to each other via the intermediate coupling component; wherein the top wall comprises a threaded hole, the bottom wall comprises a first through hole, and the intermediate coupling component comprises a second through hole; wherein the threaded screw passes through the first and second through holes and engages with the threaded hole; wherein when a voltage is applied to the piezo stacks, the piezo stacks cause a horizontal movement of the side walls by expansion or contraction of the piezo stacks, the horizontal movement causes a perpendicular movement of the top wall via the flex hinges, and the perpendicular movement causes a first translation movement of the threaded screw by the threaded hole of the top wall pulling or pushing the threaded screw; and wherein a rotation of the threaded screw relative to the threaded hole causes a second translation movement of the threaded screw.

Another embodiment of the invention provides an actuator, including: a threaded screw; and a piezo amplifier; wherein the piezo amplifier includes: a top wall, a bottom wall, a first and second side walls, the walls being joined by flex hinges; and a piezo stack; wherein one end of the piezo stack is coupled to the first side wall and the other end of the piezo stack is coupled to the second side wall; wherein the top wall comprises a threaded hole and the bottom wall comprises a through hole, both holes being offset by a distance from a plane containing the piezo stack; wherein the threaded screw passes through the through hole and engages with the threaded hole; wherein when a voltage is applied to the piezo stack, the piezo stack causes a horizontal movement of the side walls by expansion or contraction of the piezo stack, the horizontal movement causes a perpendicular movement of the top wall via the flex hinges, and the perpendicular movement causes a first translation movement of the threaded screw by the threaded hole of the top wall pulling or pushing the threaded screw; and wherein a rotation of the threaded screw relative to the threaded hole causes a second translation movement of the threaded screw.

Yet another embodiment of the invention provides an actuator, including: a threaded screw; and a first and second piezo amplifiers; wherein each of the first and second piezo amplifiers includes: a top wall, a bottom wall, a first and second side walls, the walls being joined by flex hinges; and a piezo stack; wherein one end of the piezo stack is coupled to the first side wall and the other end of the piezo stack is coupled to the second side wall; wherein the first and second piezo amplifiers are parallel and separated by a distance, and the top walls of the first and second piezo amplifiers are integrated and the integrated top walls comprise a threaded hole; wherein the threaded screw passes through the space between the first and second piezo amplifiers and engages with the threaded hole; wherein when a voltage is applied to the piezo stack of each of the first and second piezo amplifiers, the piezo stack causes a horizontal movement of the side walls by expansion or contraction of the piezo stacks, the horizontal movement causes a perpendicular movement of the top wall via the flex hinges, and the perpendicular movement causes a first translation movement of the threaded screw by the threaded hole pulling or pushing the threaded screw; and wherein a rotation of the threaded screw relative to the threaded hole causes a second translation movement of the threaded screw.

DETAILED DESCRIPTION OF THE PREFERRED EMBODIMENTS

Figure 1:
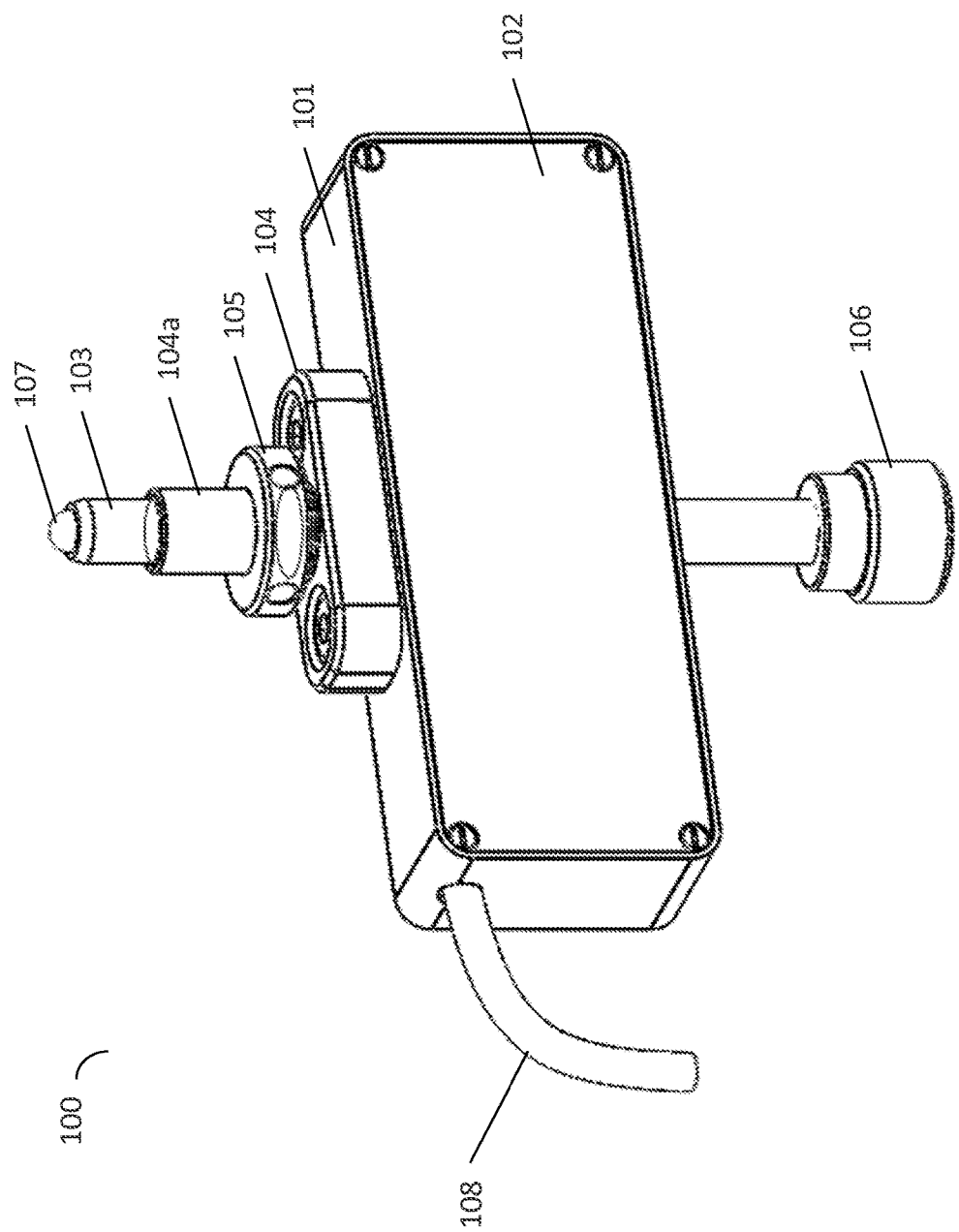
FIG. 1 illustrates a perspective view of an amplified piezo actuator according to an embodiment.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Figure 2:
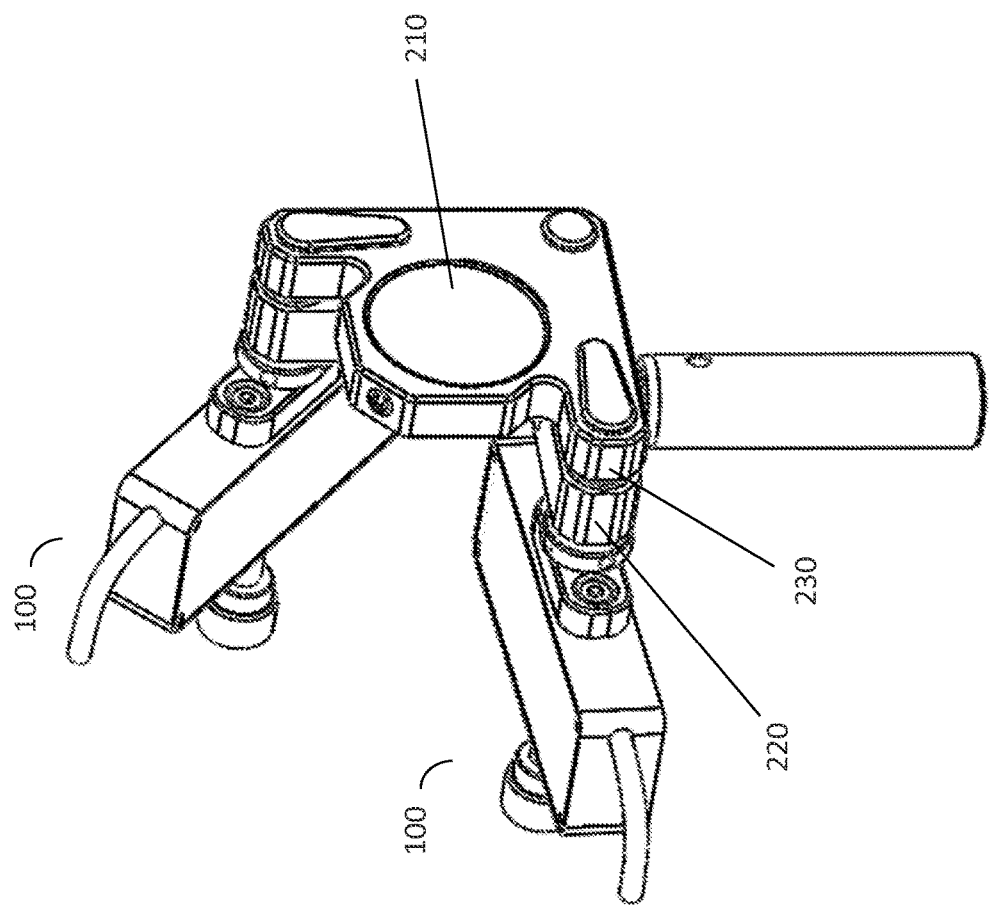
FIG. 2 illustrates an amplified piezo actuator in a typical application for steering mirrors according to an embodiment.

FIG. 1 illustrates an amplified piezo actuator with coarse adjustment according to an embodiment. Monolithic piezo flexure housing 101 accommodates one or more piezo stacks and a wire eroded mechanical amplifier architecture and is covered with cover plates 102 in both sides. The housing 101 also accommodates and holds a threaded screw 103 (with typically 100 threads per inch) to translate motion to the moving world. The screw 103 passes through a clearance hole within a mount bracket 104 to couple the monolithic flexure housing to the application. The mount bracket 104 has external thread 104a to attach the actuator to the application. FIG. 2 illustrates an example application in which a couple of amplified piezo actuators 100 are attached to the fixed world 220 of a kinematic mirror mount via the external thread 104a. The threaded screw 103 is for actuating the moving world 230 of the kinematic mirror mount, so that the mirror 210 can be adjusted. The mount bracket 104 is to be set in the desired orientation and then be locked via a threaded nut 105. A knob 106 is attached to one end of the screw 103 for manual rotation and so linear translation of typically a steel ball 107 at the other end of the screw for coarse adjustments. Although a knob is illustrated for the screw head, other shapes and forms for the screw head that enable turning of the screw by users are also contemplated. Although a steel ball is illustrated for the screw tip, other shapes, forms and/or materials for the screw tip are also contemplated. By applying and controlling the voltage to the piezo stacks within the monolithic flexure housing 101 via a cable 108, together with the turning of the knob, micrometer/nanometer-linear adjustment of the moving world in the application is then possible simultaneously.

Figure 3:
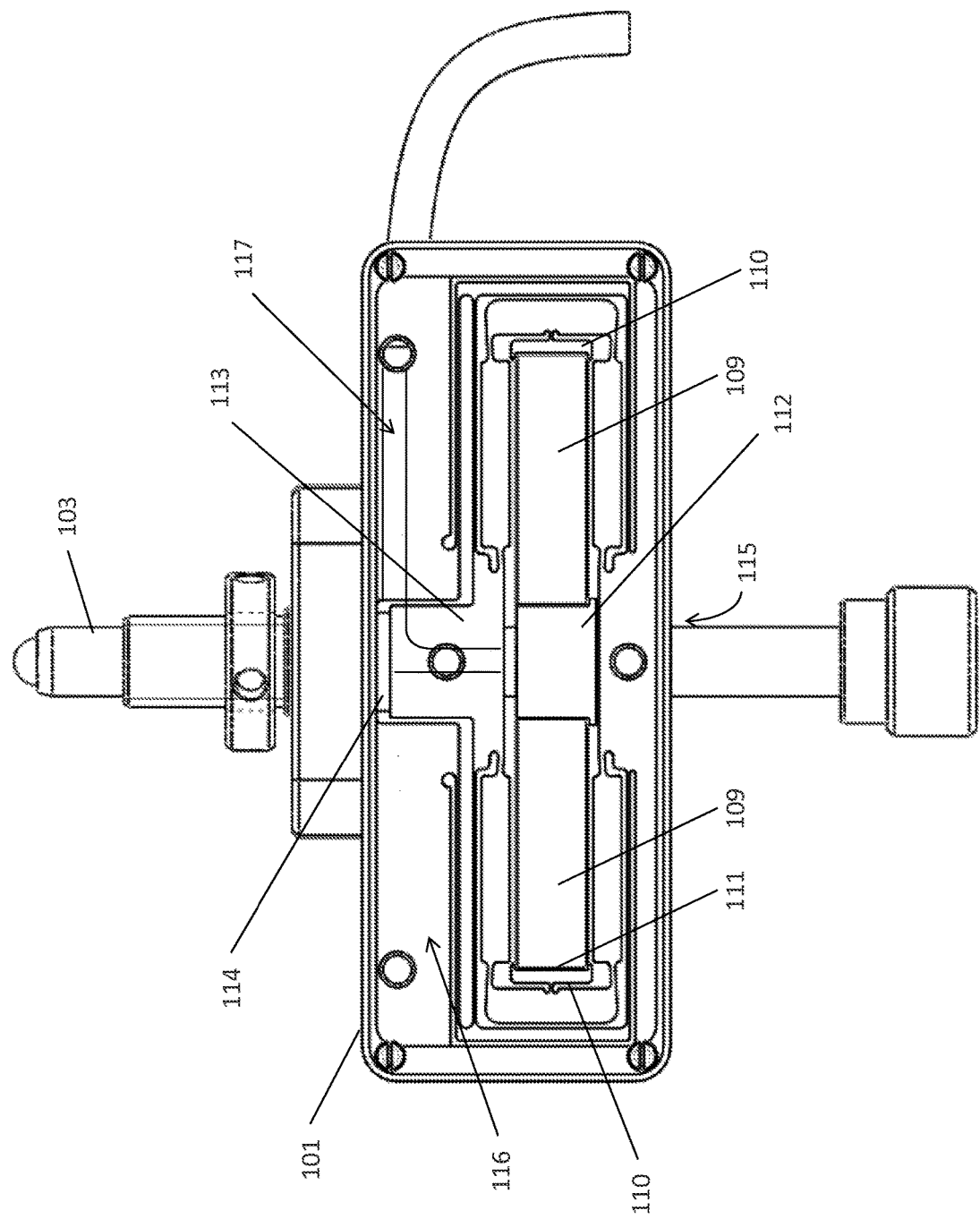
FIG. 3 illustrates the internal mechanism of an amplified piezo actuator according to an embodiment.

FIG. 3 shows the internal mechanism of the actuator according to an embodiment. In one embodiment, the mechanical amplifier mechanism is a wire-eroded hardened steel structure with flex hinges and ribs within the monolithic flexure housing. In other embodiments, various separate parts, such as flex hinges and ribs can be joined together. Two piezo stacks 109 are seen in the feature, each at a side of the screw 103, sitting onto end cup features 110 and coupled with the amplifier structure via thin coupling interface layers 111. The other side of each piezo stack 109 sits onto the surface of an intermediate piezo coupling component 112. In one embodiment, the coupling interface 111 at each end of the piezo stacks consists of layers of typically sub-micron to tens of micron of multiple materials including one or more aluminum, steel and also adhesive layers. These coupling layers have three functions. Aluminum layers provide a proper mechanical stress distribution on the mating surface between the ceramic piezo stack 109 and steel end cap 110. Steel layers provide a means of preloading the mechanism by opening the distance between the two end caps 110 for increasing the stiffness of the system for high frequency operation. Adhesive layers are to provide rigidity to the mechanical coupling in case of a resonance.

Figure 5:
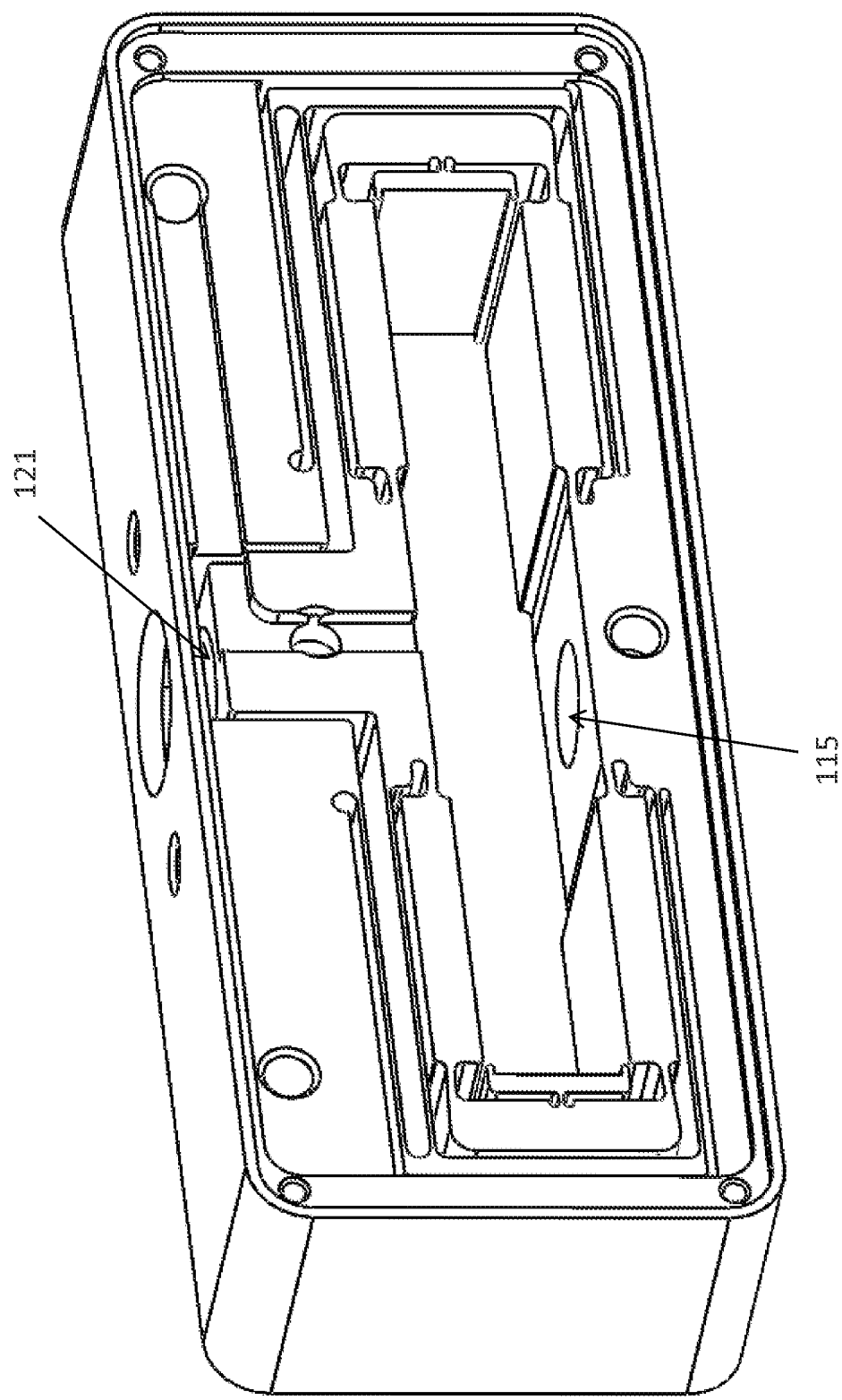
FIG. 5 illustrates a perspective view of the flex hinges within the amplified piezo actuator according to an embodiment.

By excitation of the piezo stacks with a change in driving voltage, the expansion of piezo stacks results in a displacement of the end caps 110 in the horizontal direction and consequently an amplified displacement in the perpendicular direction is obtained due to the chosen angular orientation of the tension members and the flex hinges. The amplified displacement is translated to the output feature of the amplifier 113 for pulling and pushing the screw 103 via internal threads, either made within the monolithic housing 121 (shown in FIG. 5) or via an interface threaded bush 114. The screw 103, which is free from one side the housing via a clearance through hole 115, through the intermediate piezo coupling component 112 and from the other side is engaged with the moving world of amplifier design 113, can translate the amplified piezo motion to the application at the same time as when a coarse adjustment is made by the screw 103 via the knob 106. In one embodiment, the monolithic flexure housing 101 has a space 116 for sensing electronics to operate in closed loop mode. The cables for driving the piezo stacks and sensor are managed via channel 117 within the structure.

Figure 4:
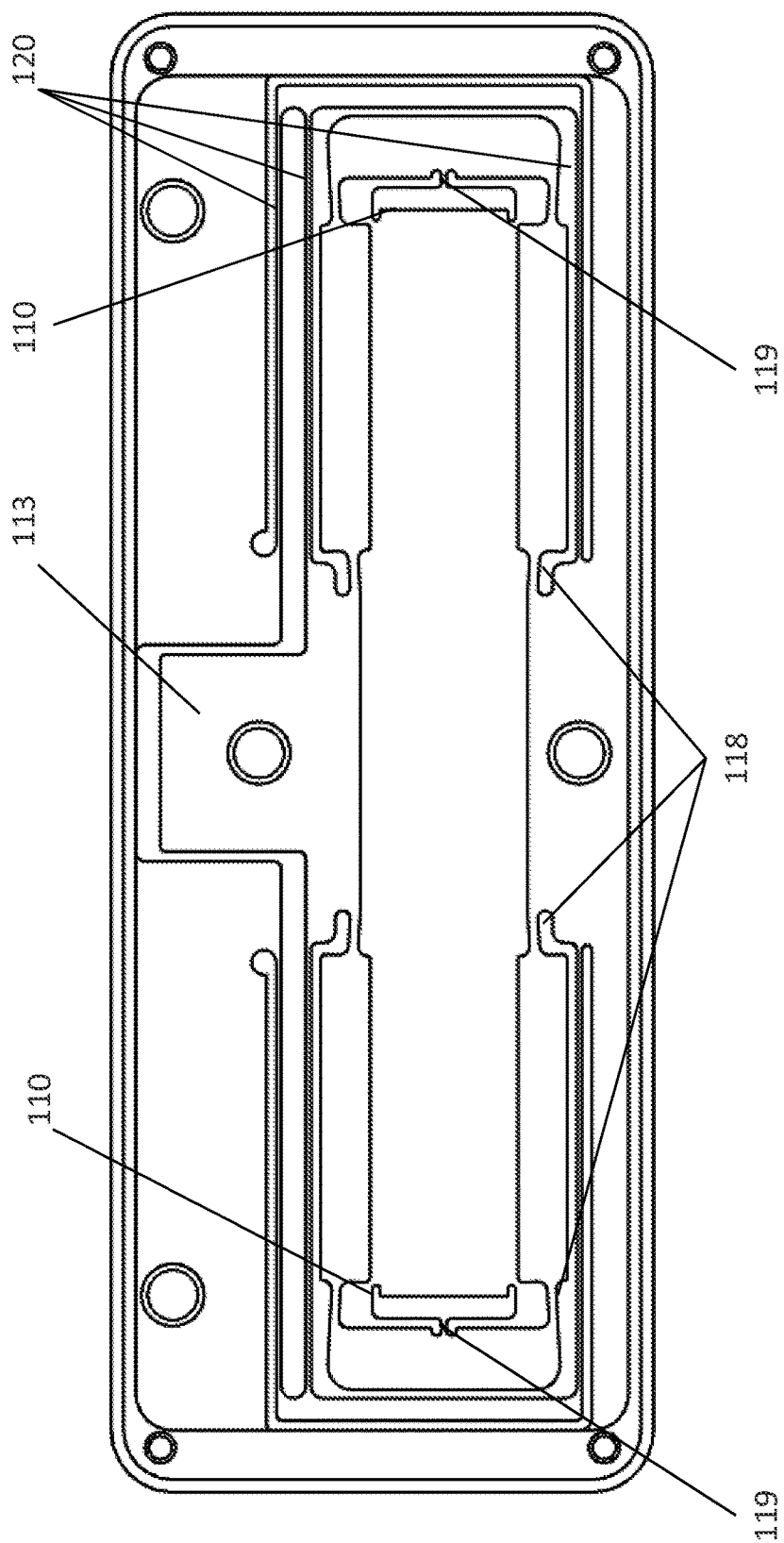
FIG. 4 illustrates the flex hinges within the amplified piezo actuator according to an embodiment.

FIG. 4 shows the flex hinges 118 within the amplifier according to an embodiment. FIG. 4 also features how end cups 110 are part of the amplifier design via piezo coupling flex hinges 119. The geometries of flex hinges can be made with tight manufacturing tolerances and is crucial in providing a well maintained perpendicularity between the piezo stacks axis and the screw direction. A straightness angular error between the piezo stack motion direction and the center line between the two flex hinges 119 can be compensated via flexing the hinges for both proper distribution of stress on the surface of the stack and also to avoid losing mechanical amplification factor.

FIG. 4 also shows an anti-roll features in the form of vertical and/or horizontal flex ribs 120 within the monolithic flexure housing to control the planar cross-talk motion in relation to the piezo amplified displacement and also provide strength to the flexure structure when coarse displacement of the screw via the threaded hole within the monolithic flexure housing 121 (shown in FIG. 5) or via an internally threaded bush 114 (shown in FIG. 3).

Figure 6:
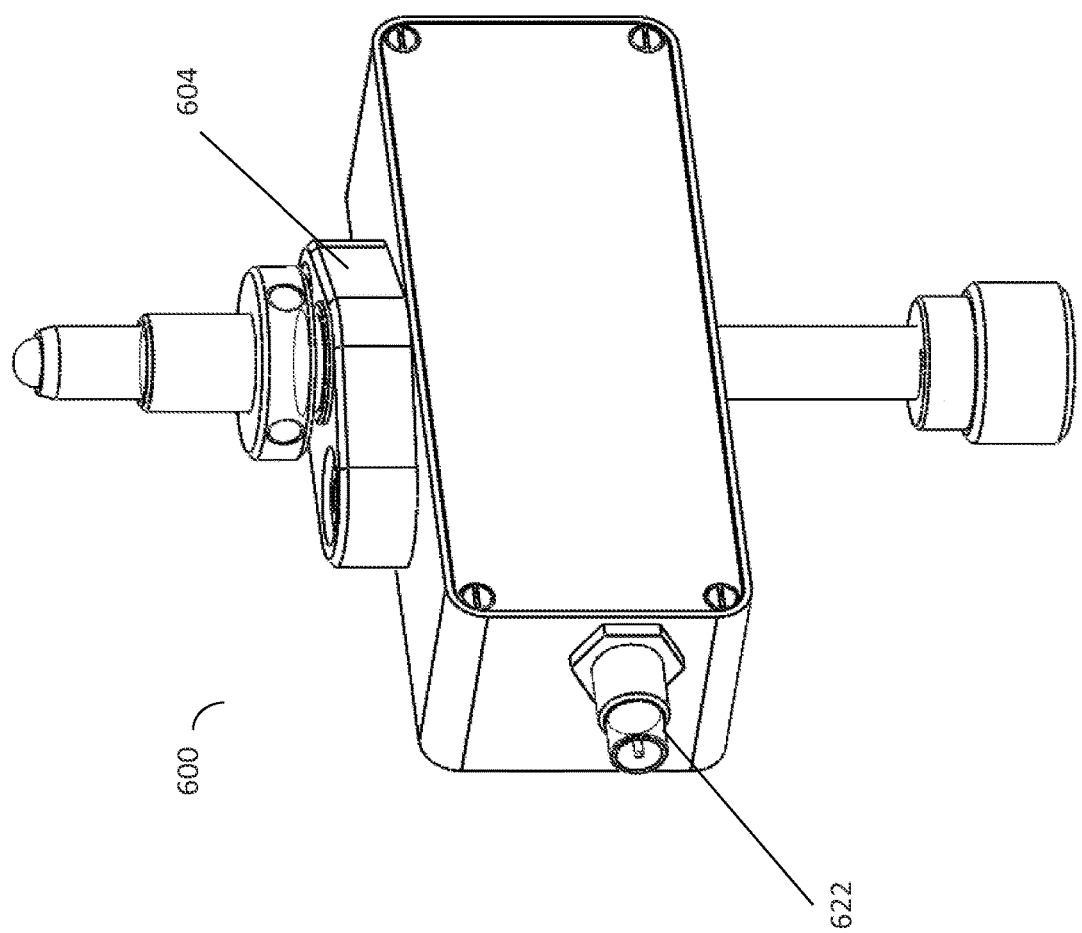
FIG. 6 illustrates a perspective view of an amplified piezo actuator according to another embodiment.
Figure 7:
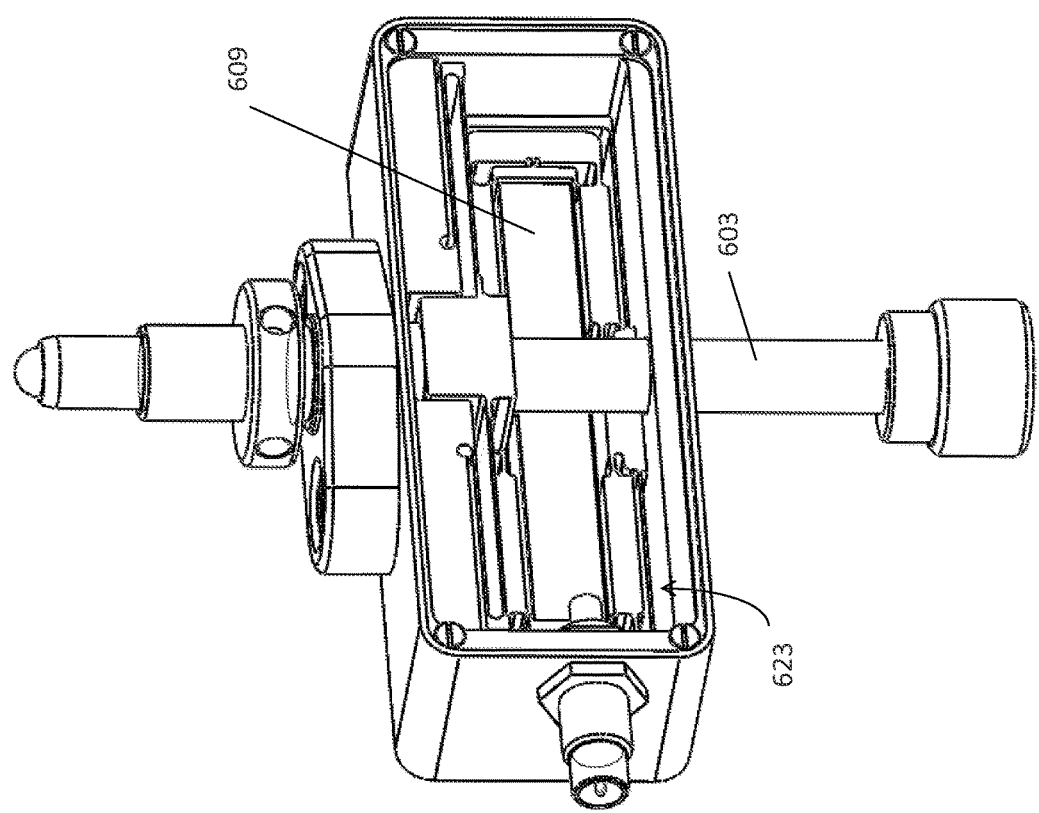
FIG. 7 illustrates a first perspective view of the internal mechanism of an amplified piezo actuator according to an embodiment.
Figure 8:
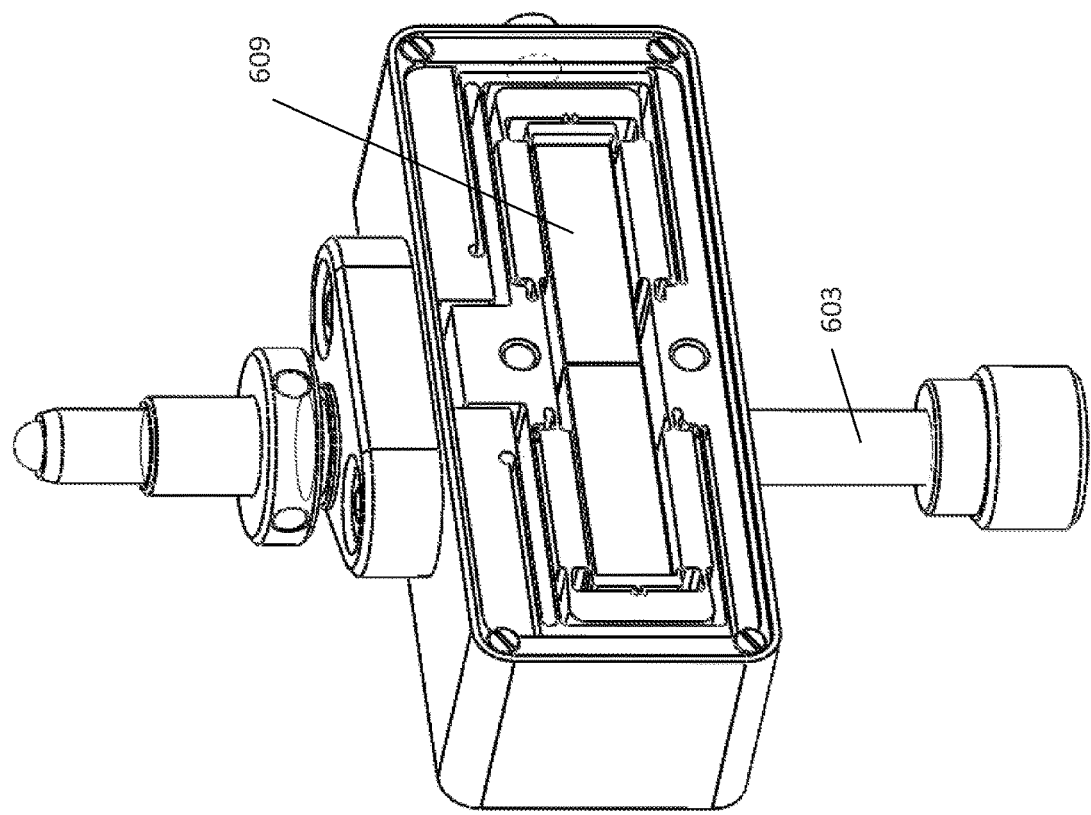
FIG. 8 illustrates a second perspective view of the internal mechanism of an amplified piezo actuator according to an embodiment.
Figure 9:
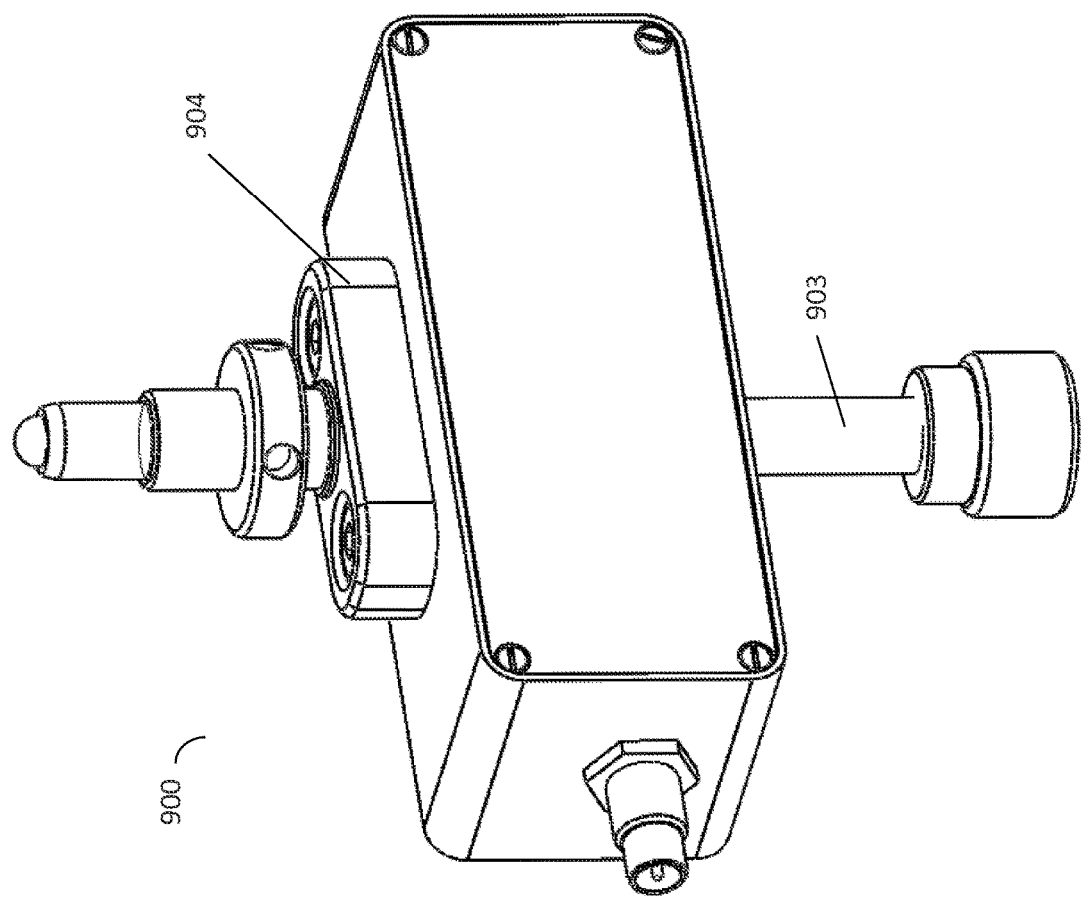
FIG. 9 illustrates a perspective view of an amplified piezo actuator according to another embodiment.
Figure 10:
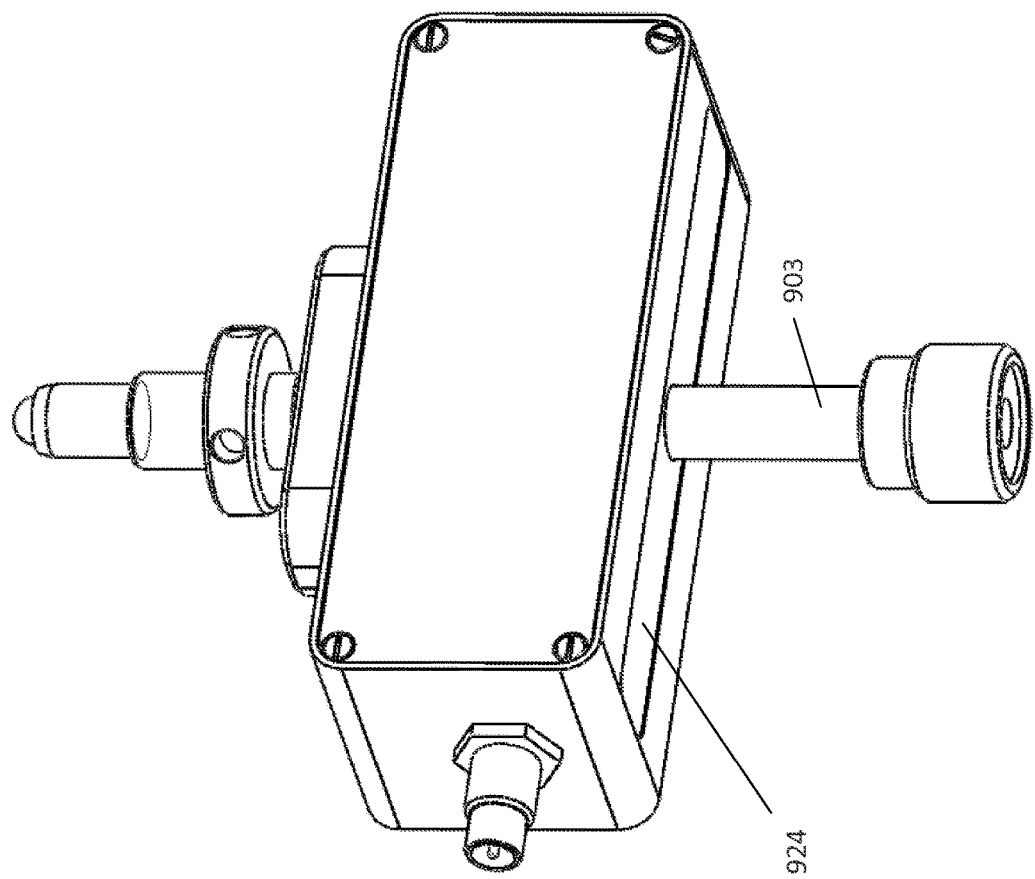
FIG. 10 illustrates a first perspective view of the internal mechanism of an amplified piezo actuator according to an embodiment.
Figure 11:
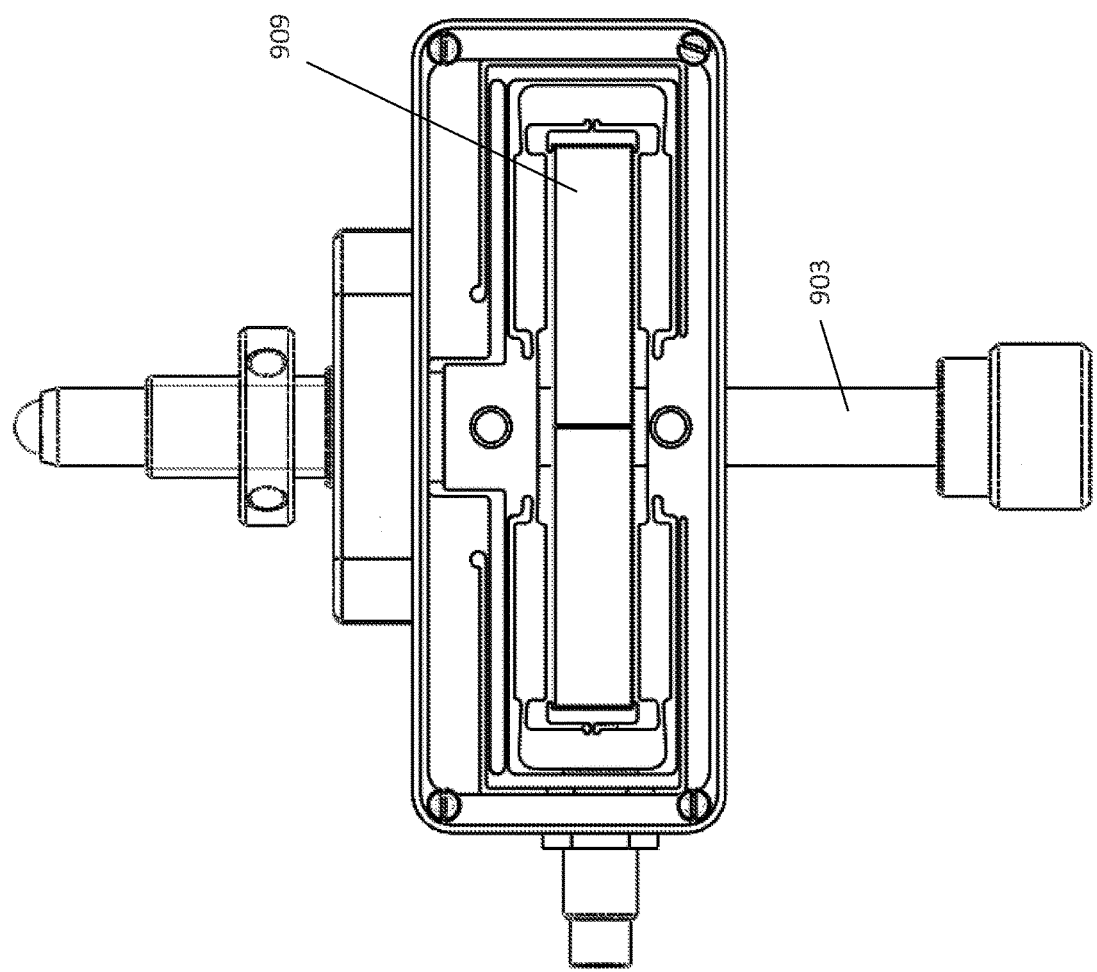
FIG. 11 illustrates the internal mechanism of an amplified piezo actuator according to an embodiment.
Figure 12:
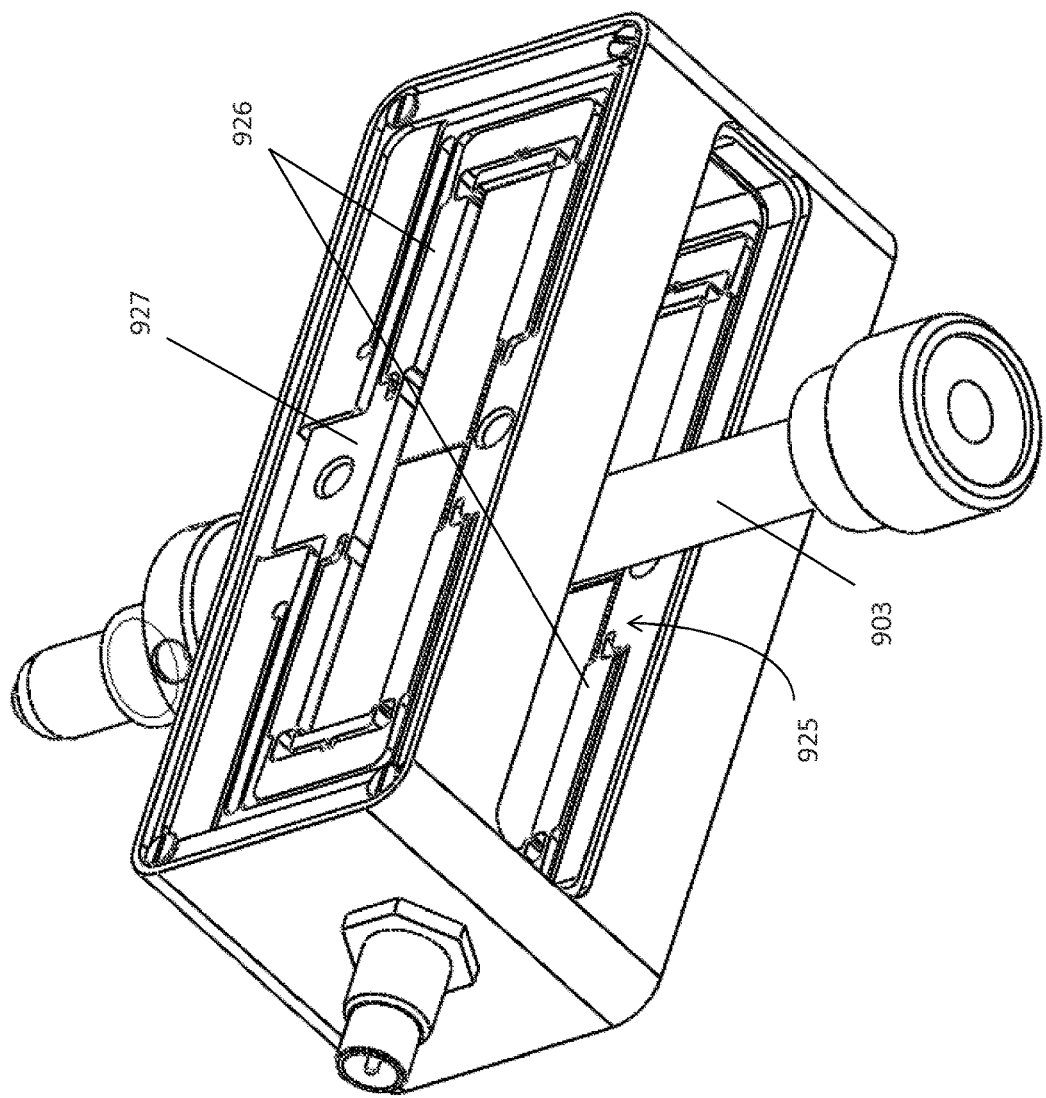
FIG. 12 illustrates a second perspective view of the internal mechanism of an amplified piezo actuator according to an embodiment.

Referring to FIGS. 6-8, in another embodiment, there is an amplified piezo actuator 600 with similar features to the amplified piezo actuator 100 discussed above, except that the screw 603 does not pass through the piezo stack axis via the intermediate coupling component 112. Instead, there is an offset of the through hole and the intermediate mount bracket 604 relative to the piezo stack so that the screw does not intersect with the piezo stack, but go above or below the piezo stack. This removes the need for having the intermediate coupling component 112 and also opens up more flexible embedding of sensor electronic and connectors 622 (instead of flying lead approach) given the additional space 623 for cable management. The additional space 623 also provides possibility of further preloading the actuator by springs connecting fixed world to the moving world. Since the piezo stacks 609 are directly attached to each other, this embodiment reduces the width of the actuator. Note that the amplified piezo actuator 600 according to this embodiment may experience more cross-talk with changing reaction force onto the screw from application due to the offset between the screw and the piezo stack/amplifier features creating a moment on the flexures.

Referring to FIGS. 9-12, in yet another embodiment, there is an amplified piezo actuator 900 that has similar features to the amplified piezo actuators 100, 600 discussed above, except that the monolithic flexure housing has a thicker geometry and a pocket 925 to allow the screw 903 to pass through the middle of the housing. The mount bracket 904 allows the actuator to attach to the application. A bottom cover 924 closes the opening of the pocket. This embodiment offers two amplifiers with extra piezo stacks and integrated via the anti-roll features 920. Dual amplification 926 offers higher driving force for actuation and also given the geometries of the flexure housing, a higher stiffness is achieved for demanding application with higher operating frequencies. In addition, the symmetry provided in the dual amplification 926 between the reaction forces onto the screw is transferred to the single amplifier output 927 in the moving world to minimize cross-talk planar translation.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. An actuator, comprising:
a threaded screw; and
a piezo amplifier;
wherein the piezo amplifier comprises:
a top wall, a bottom wall, a first and second side walls, the walls being joined by flex hinges;
a first and second piezo stacks; and
an intermediate coupling component;
wherein one end of the first piezo stack is coupled to the first side wall, one end of the second piezo stack is coupled to the second side wall, and the other ends of the first and second piezo stacks couple to each other via the intermediate coupling component;
wherein the top wall comprises a threaded hole, the bottom wall comprises a first through hole, and the intermediate coupling component comprises a second through hole;
wherein the threaded screw passes through the first and second through holes and engages with the threaded hole;
wherein when a voltage is applied to the piezo stacks, the piezo stacks cause a horizontal movement of the side walls by expansion or contraction of the piezo stacks, the horizontal movement causes a perpendicular movement of the top wall via the flex hinges, and the perpendicular movement causes a first translation movement of the threaded screw by the threaded hole of the top wall pulling or pushing the threaded screw; and
wherein a rotation of the threaded screw relative to the threaded hole causes a second translation movement of the threaded screw.

2. An actuator, comprising:
a threaded screw; and
a piezo amplifier;
wherein the piezo amplifier comprises:
a top wall, a bottom wall, a first and second side walls, the walls being joined by flex hinges; and
a piezo stack;
wherein one end of the piezo stack is coupled to the first side wall and the other end of the piezo stack is coupled to the second side wall;
wherein the top wall comprises a threaded hole and the bottom wall comprises a through hole, both holes being offset by a distance from a plane containing the piezo stack;
wherein the threaded screw passes through the through hole and engages with the threaded hole;
wherein when a voltage is applied to the piezo stack, the piezo stack causes a horizontal movement of the side walls by expansion or contraction of the piezo stack, the horizontal movement causes a perpendicular movement of the top wall via the flex hinges, and the perpendicular movement causes a first translation movement of the threaded screw by the threaded hole of the top wall pulling or pushing the threaded screw; and
wherein a rotation of the threaded screw relative to the threaded hole causes a second translation movement of the threaded screw.

3. An actuator, comprising:
a threaded screw; and
a first and second piezo amplifiers;
wherein each of the first and second piezo amplifiers comprises:
a top wall, a bottom wall, a first and second side walls, the walls being joined by flex hinges; and
a piezo stack;
wherein one end of the piezo stack is coupled to the first side wall and the other end of the piezo stack is coupled to the second side wall;

wherein the first and second piezo amplifiers are parallel and separated by a distance, and the top walls of the first and second piezo amplifiers are integrated and the integrated top walls comprise a threaded hole;

wherein the threaded screw passes through the space between the first and second piezo amplifiers and engages with the threaded hole;

wherein when a voltage is applied to the piezo stack of each of the first and second piezo amplifiers, the piezo stack causes a horizontal movement of the side walls by expansion or contraction of the piezo stacks, the horizontal movement causes a perpendicular movement of the top wall via the flex hinges, and the perpendicular movement causes a first translation movement of the threaded screw by the threaded hole pulling or pushing the threaded screw; and wherein a rotation of the threaded screw relative to the threaded hole causes a second translation movement of the threaded screw.

4. The actuator of claim 1, wherein the head of the screw comprises a turning knob.

5. The actuator of claim 1, wherein the tip of the screw comprises a steel ball.

6. The actuator of claim 1, wherein each of the first and second side walls comprises an end cup for coupling with the piezo stacks, each of the first and second side walls being connected to its end cup via a flex hinge.

7. The actuator of claim 1, wherein each of the first and second side walls comprises a coupling interface for coupling with the piezo stacks, and the coupling interface comprises a plurality of layers including one or more aluminum, steel and adhesive layers.

8. The actuator of claim 2, wherein the head of the screw comprises a turning knob.

9. The actuator of claim 2, wherein the tip of the screw comprises a steel ball.

10. The actuator of claim 2, wherein each of the first and second side walls comprises an end cup for coupling with the piezo stacks, each of the first and second side walls being connected to its end cup via a flex hinge.

11. The actuator of claim 2, wherein each of the first and second side walls comprises a coupling interface for coupling with the piezo stacks, and the coupling interface comprises a plurality of layers including one or more aluminum, steel and adhesive layers.

12. The actuator of claim 3, wherein the head of the screw comprises a turning knob.

13. The actuator of claim 3, wherein the tip of the screw comprises a steel ball.

14. The actuator of claim 3, wherein each of the first and second side walls comprises an end cup for coupling with the piezo stacks, each of the first and second side walls being connected to its end cup via a flex hinge.

15. The actuator of claim 3, wherein each of the first and second side walls comprises a coupling interface for coupling with the piezo stacks, and the coupling interface comprises a plurality of layers including one or more aluminum, steel and adhesive layers.

* * * * *